April 10, 1945.   L. WALLIN   2,373,520
HYPODERMIC SYRINGE
Filed Dec. 2, 1944

LOREN WALLIN
Inventor

By
Attorney

Patented Apr. 10, 1945

2,373,520

UNITED STATES PATENT OFFICE 2,373,520

HYPODERMIC SYRINGE

Loren Wallin, Wadesboro, N. C.

Application December 2, 1944, Serial No. 566,285

2 Claims. (Cl. 128—215)

This invention relates to an improved syringe to which a hypodermic needle is adapted to be secured for making intradermal injections and other injections into patients, whereby a definite amount of the liquid can be injected into the patient.

It is an object of this invention to provide a syringe constructed so as to remove the human element of error. With my syringe, properly operated, a pre-determined amount of the medication can be injected each time into the patient.

Let us suppose that a syringe holds one cubic centimeter, and in testing for various diseases, it is desired to inject a definite amount, such as one-tenth of a cubic centimeter, into the patient for test purposes. By graduating the plunger into the proper dosages, and etching cavities in the plunger at these graduations, and having a spring-pressed member engaging the plunger, when the plunger is moved into the syringe, it will stop after a definite amount, say one-tenth of a cubic centimeter of the fluid has been injected into the patient.

This type of a syringe is often used in intradermal testing and medication. This includes tuberculin, Schick, Dick, and all of the numerous skin tests made for allergic conditions. There are other tests less often used. This type of syringe is particularly adaptable for tests known as group testing. The two types of group testing done routinely are Schick testing for determining the susceptibility to diphtheria, and tuberculin testing to determine whether or not tuberculosis is present. These two tests are performed routinely by all health departments in the schools. These, and all other tests depend for their value, upon absolute accuracy, and one-tenth of a cubic centimeter is usually the dose. This permits of no variation. Less than the prescribed dose might result in a false negative, and more than the prescribed dose might result in a false positive. The volume of this work is so great, and in addition, is so closely allied with other phases of the public school health program, that this is usually assigned to the nurses to do. Whether they possess the degree of skill necessary to perform these very delicate tasks is often doubtful. When giving these tests by present methods, there are two things which might be carefully watched, one is the position of the needle in the skin, the other the position of the plunger in the barrel of the syringe, and the very fine graduations on the barrel of the syringe. If the needle penetrates too deeply, the agent will be deposited subcutaneously and be rapidly absorbed, and the value as far as determining whether or not there is a following reaction is lost. In giving undivided attention to the movement of the plunger within the barrel, this sometimes happens. If, on the other hand, too close attention is given to the position of the needle, the exact amount of one-tenth of a cubic centimeter may, and probably will not be given.

With my improved syringe, the dose is automatically controlled with the entire attention of the attendant or operator being given to keeping the needle in the proper position. With the old type of syringe, the plunger is moderately easily movable in the syringe barrel, and in giving tests, say where one-tenth of a cubic centimeter is to be given to each patient, it is necessary that the operator note exactly the reading on the barrel or the plunger of the syringe before the needle is inserted into the patient, and also to stop the plunger at a definite point on the graduations so as to give exactly the one-tenth of a cubic centimeter or other dosage which is required. By means of my improved syringe, the operator merely turns the plunger a partial revolution to cause the detent to ride out of the depression in which it has stopped, and after the plunger has been forced into the barrel, a predetermined amount, the detent will drop into the next graduation or cavity and will automatically stop the inward movement of the plunger, and thus the exact dosage will be given and the operator will be permitted to focus his entire attention on the position of the needle in the skin of the patient.

Some of the objects of the invention having been stated, other objects will appear as the description proceeds, when taken in connection with the accompanying drawing, in which—

Figure 1:
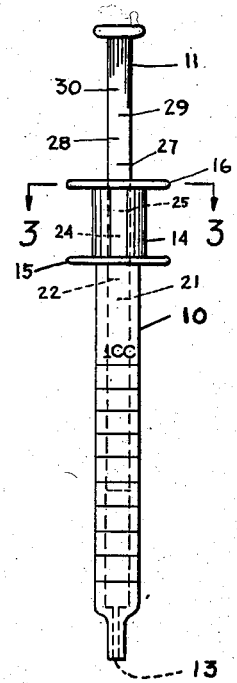
Figure 1 is an elevation of my improved syringe; omitting the conventional hypodermic needle which is attached to the lower end thereof.

Referring more specifically to the drawing, the numeral 10 indicates the syringe barrel in which a plunger 11 is adapted to have sliding movement. The lower end of the syringe has the conventional opening 13 for egress of the fluid from the syringe barrel through a suitable hypodermic needle (not shown) which is attached to the discharge end of the syringe. The syringe is graduated in any suitable manner, in the drawing it being shown as graduated in .1 c. c. graduations. The plunger is also shown as being graduated in .1 c. c. graduations so as to deliver .1 c. c. of the fluid upon each inward movement of the plunger before it is stopped by the detent. It is to be understood that the plunger and the syringe barrel can be graduated in any desired pattern to deliver less or more than .1 c. c. for definite purposes.

Figures 2, 5:
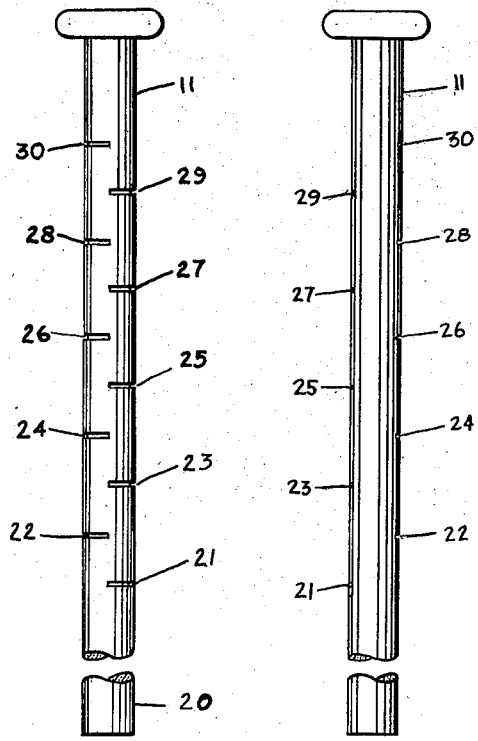
Figure 2 is an enlarged detail view of my improved plunger for a syringe.
Figure 5 is an elevation showing the reverse side of the plunger from that that shown in Figure 2.
Figure 4:
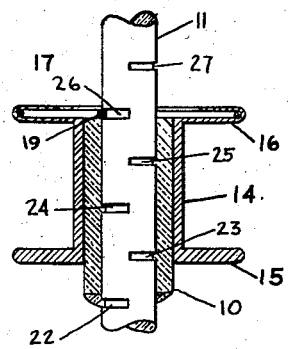
Figure 4 is a cross sectional view through the syringe and taken along the line 4—4 in Figure 3.
Figure 3:
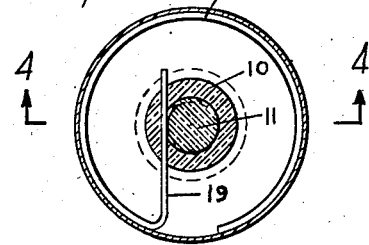
Figure 3 is a cross sectional view on an enlarged scale and taken along the line 3—3 in Figure 1.

The plunger barrel 10 has secured around the upper end thereof a tubular member 14 which is usually metallic, having a flange 15 and another flange 16, the flange 16 being thinner and reversely bent inwardly as at 17 to provide a cavity into which a spring member 18 is adapted to be fitted. This spring member 18 has a leg or detent portion 19 which extends across and resiliently engages the plunger 11 at all times. The plunger 11 has a ground smooth portion 20 on its lower end, serving as tight seal between the wall of the cavity of the syringe 10 and the plunger so the plunger will act as a pump when it is drawn upwardly to cause the liquid to flow into the barrel 10 of the syringe. The main portion, however, of the plunger 11 has a plurality of graduations 21, 23, 25, 27 and 29 in the form of cavities on one portion thereof which extend approximately 90 degrees around the periphery of the plunger and it also has a plurality of graduations in the form of cavities 22, 24, 26, 28 and 30, which extend approximately 90 degrees around the periphery of the plunger and being disposed in offset relation to the graduations 21, 23, 25, 27 and 29. This gives approximately 180 degrees of the plunger surface on one side which is perfectly smooth and which can be turned to engage the detent 19 when the syringe is being filled. When the syringe is filled, it will be turned until the detent 19 rests in the cavity 21. Immediately after the needle is inserted in the patient, the plunger is turned to where the detent engages the smooth portion of the plunger immediately to the left of the cavity 21 in Figure 2, and the plunger is then forced inwardly in the syringe barrel 10 until the detent 19 falls into the cavity 22. For the next patient, the needle is inserted in the patient and the plunger is given a slight turn to the right of cavity 22 in Figure 2, or midway between the cavity 21 and 23 and the plunger is again forced inwardly and will automatically stop when the detent 19 falls into the cavity 23. This operation is repeated until the plunger is moved all the way inwardly to where the detent 19 will rest in the cavity 30, at which time the last dose in the barrel is ready to be delivered.

It is thus seen that by graduating the plunger to deliver any desired amount, and etching or otherwise forming these graduations in the form of cavities, and by use of the detent 19, it is therefore seen that a definite amount of the fluid will be delivered into the patient upon each inward movement of the plunger, and the plunger will automatically stop when the detent 19 falls into the next succeeding cavity.

In the drawing and specification, there has been set forth a preferred embodiment of the invention, and although specific terms are employed, they are used in a generic and descriptive sense only, and not for purposes of limitation, the scope of the invention being defined in the claims.

I claim:

1. In a hypodermic syringe comprising a barrel portion and a plunger, said plunger having a plurality of graduations equally spaced thereon, said graduations being in the form of cavities extending for a portion of the periphery of the plunger, said plunger having a second series of graduations disposed on another portion thereof, and offset with relation to the first set of graduations, the second set of graduations also being in the form of cavities, said barrel portion having a spring-pressed detent mounted thereon adapted to engage the periphery of the plunger, and to fall into one of the graduations when the plunger is moved inwardly, the plunger being adapted to be rotated axially to remove the detent from the cavity into which it has fallen so that as the plunger is moved further inwardly, the detent will fall into a cavity in the other set of graduations on the plunger.

2. In a hypodermic syringe having a barrel portion and a plunger, the plunger having a plurality of graduations extending for a portion of the periphery of the plunger, said graduations being in the form of cavities, said plunger having also, another set of graduations disposed on another portion of the plunger, and being in offset relation to the first set of graduations, the second set of graduations being also in the form of cavities, and a spring-pressed detent mounted on the barrel portion of the syringe and adapted to press at all times against the plunger to fall into one of one set of cavities when the plunger is in one position, and when the plunger is rotated relatively to the barrel, and moved further inwardly, the detent will fall into the next succeeding cavity of the second set of graduations.

LOREN WALLIN.